United States Patent
Lawrence

(10) Patent No.: US 9,425,604 B1
(45) Date of Patent: Aug. 23, 2016

(54) ADJUSTABLE ELECTRICAL CORD CONNECTOR PROTECTION DEVICE

(71) Applicant: James Brooks Lawrence, Cambria, CA (US)

(72) Inventor: James Brooks Lawrence, Cambria, CA (US)

( * ) Notice: Subject to any disclaimer, the term of this patent is extended or adjusted under 35 U.S.C. 154(b) by 147 days.

(21) Appl. No.: 14/565,194

(22) Filed: Dec. 9, 2014

Related U.S. Application Data

(60) Provisional application No. 61/915,726, filed on Dec. 13, 2013.

(51) Int. Cl.
*H02G 3/04* (2006.01)
*H02G 15/00* (2006.01)
*H02G 15/007* (2006.01)

(52) U.S. Cl.
CPC .................... *H02G 15/007* (2013.01)

(58) Field of Classification Search
CPC ..... H02G 15/00; H02G 15/007; H02G 15/04; H02G 15/06; H02G 15/064; H02G 15/10; H02G 15/113; H02G 15/18; H02G 15/013; H02G 3/22; H01R 13/6397; H01R 13/639; H01R 13/52; H01R 13/521; H01R 13/5213; H01R 13/6392; H01R 13/6395
USPC .......... 174/135, 72 A, 68.1, 68.3, 72 C, 88 R, 174/91, 92; 439/368, 367, 449
See application file for complete search history.

(56) References Cited

U.S. PATENT DOCUMENTS

| | | | | |
|---|---|---|---|---|
| 3,183,302 A | * | 5/1965 | Wochner | H02G 15/18 174/92 |
| 3,344,393 A | * | 9/1967 | Hendee | H01R 13/6392 439/367 |
| 4,643,505 A | * | 2/1987 | House | H01R 13/6392 174/92 |
| 4,992,629 A | * | 2/1991 | Morais | H02G 15/007 174/135 |
| 5,135,409 A | * | 8/1992 | Thompson | H01R 13/6392 439/367 |
| 5,217,387 A | * | 6/1993 | Hull | H02G 15/18 439/367 |
| 5,259,782 A | * | 11/1993 | Giffin | H01R 13/6392 439/369 |
| 5,306,176 A | * | 4/1994 | Coffey | H01R 13/6392 439/367 |
| 5,755,588 A | * | 5/1998 | Sweatman | H01R 13/6392 439/369 |
| 6,896,537 B2 | | 5/2005 | Burton | |
| 6,948,963 B2 | | 9/2005 | Burton | |
| 7,175,463 B2 | | 2/2007 | Burton | |
| 7,273,984 B2 | | 9/2007 | Murphy | |
| 7,544,082 B1 | | 6/2009 | Halvorsen | |
| 9,136,686 B2 | * | 9/2015 | Starke | H02G 15/013 |

OTHER PUBLICATIONS

Waterproof Extension Cord Covers, Webpage http://www.littlegreenhouse.com/accessory/electrical.shtml, Aug. 14, 2013.
Cord Connect, Power Cord Connector—Amazon.com, Webpage http://www.amazon.com/Cord-Connect-Power-Connector/dp/B000ZD3Y . . . , Aug. 14, 2013.
Stanley 39387 EZ Protect Outdoor Power Cord Protection Connector Box, Webpage http://www.amazon.com/Stanley-39387-Protect-Protection-Connector/dp . . . , Aug. 14, 2013.

* cited by examiner

*Primary Examiner* — Angel R Estrada
(74) *Attorney, Agent, or Firm* — Bill & Mary Lou Inc.; William Keyworth

(57) ABSTRACT

An enclosure for connected electrical connectors provides protection for a multiplicity of sizes of connector and electrical cords to protect the connectors and adjacent cord from stress on the cord, mechanical shocks, and adverse environments.

18 Claims, 11 Drawing Sheets

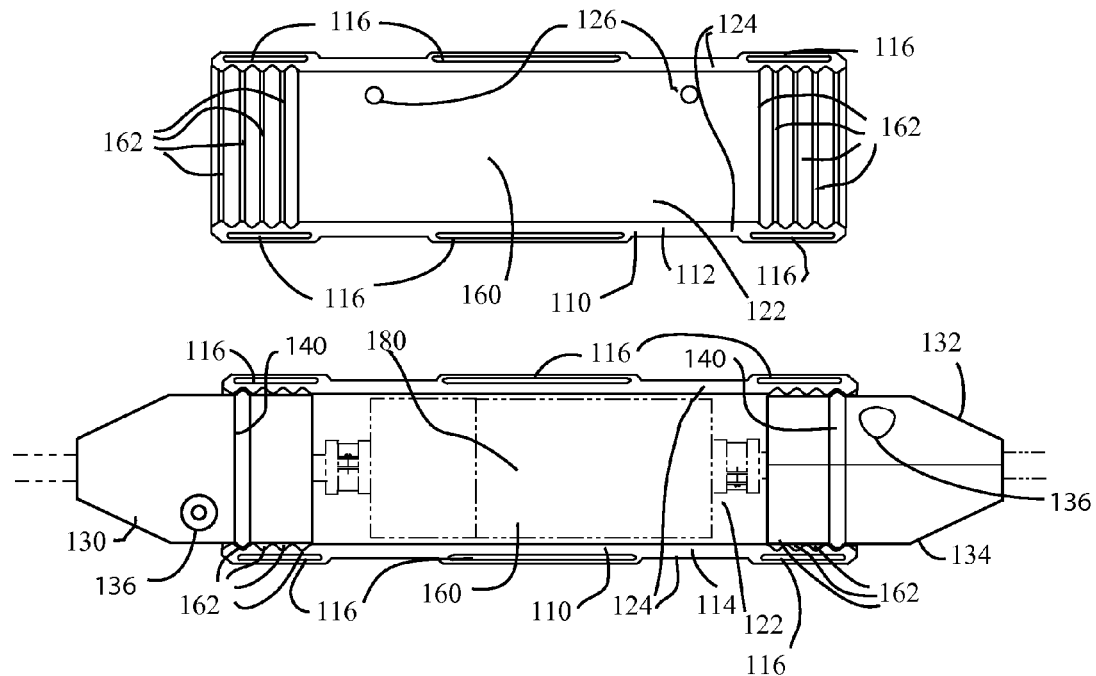
Fig. 7
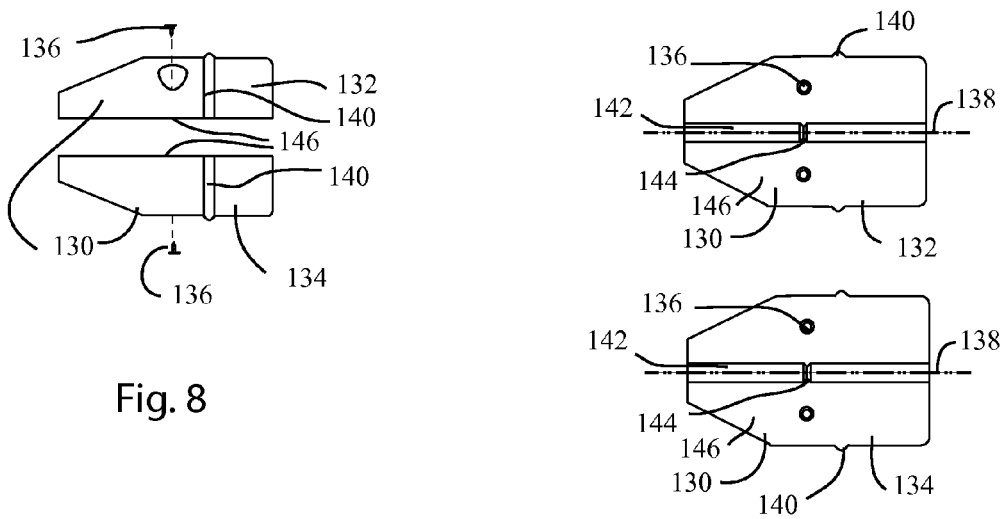
Fig. 8
Fig. 9

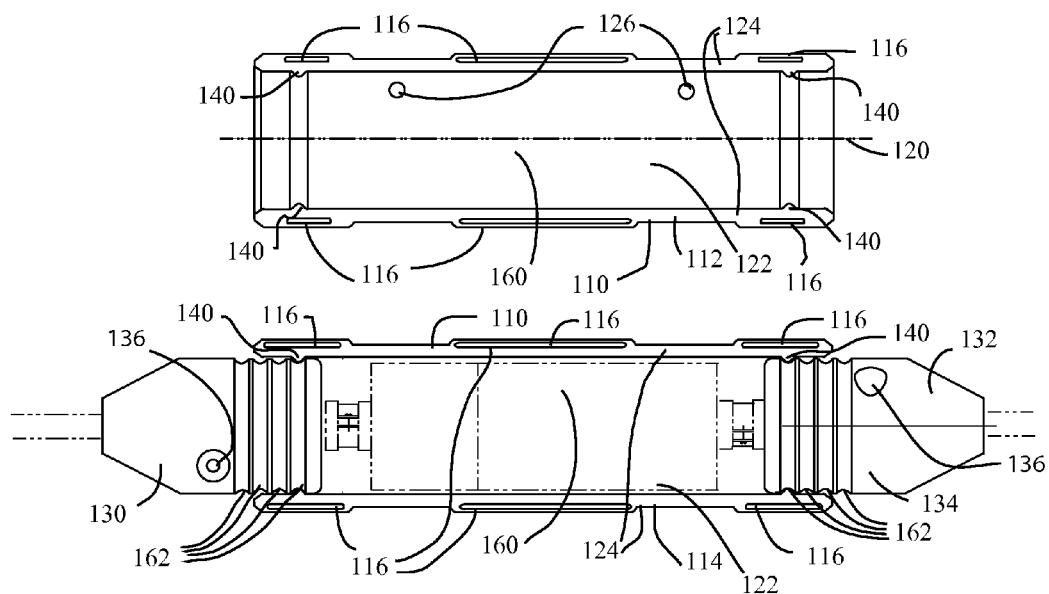
Fig. 15
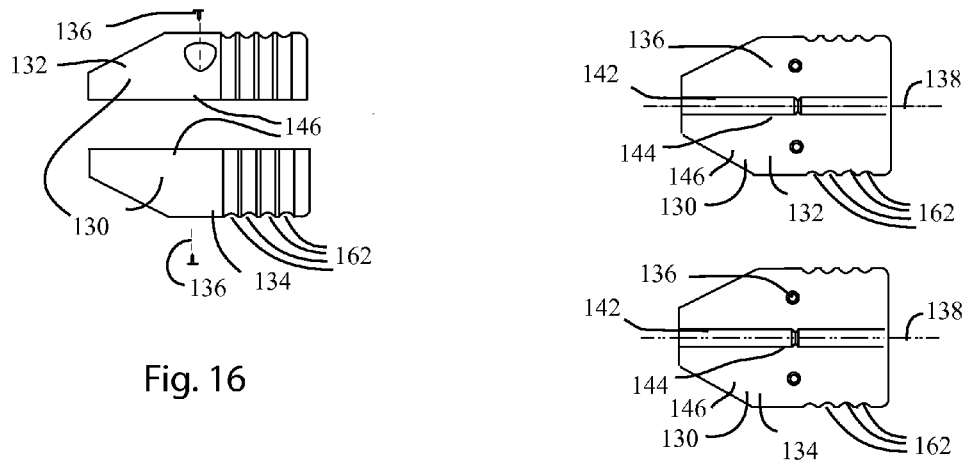
Fig. 16
Fig. 17

ADJUSTABLE ELECTRICAL CORD CONNECTOR PROTECTION DEVICE

CROSS-REFERENCE TO RELATED APPLICATIONS

This application claims the benefit of priority from Provisional Patent Application No. 61/915,726 filed on Dec. 13, 2013, which is incorporated herein by reference in its entirety.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to an article of manufacture which shelters and protects electrical connectors and adjacent cord from degrading environments, mechanical shocks and stress, and a method of protecting electrical connectors and adjacent cord using the device.

2. Description of Related Art

Electrical connectors used to terminate extension cords and the power cord connectors that are mated to them can suffer significant damage in use, especially in an industrial shop or construction environment. The cords can be damaged at the plug and socket connections by being accidentally over-tensioned (pull on excessively). Such damage can result in failure to maintain the electrical circuit connection or dangerously exposed damaged electrical cord and connectors. Protective enclosures are sometimes used to shelter connectors from effects of rain, snow and dirt, but those currently available do not provide the support and durability needed to protect from severe mechanical stresses including stress on the electrical cord and the cord-connector joint. Without an adequate means of containment and restraint of the cords adjacent to the connectors, they remain vulnerable to disconnection or degradation caused by stresses on the cords resulting from movement of the power tool or electrical appliance, or movement of the power cord due to contact with moving materials in a construction or shop environment. Without a means of enclosure that also protects from adverse dirty or corrosive environmental conditions the connectors are subject to electrical failures and degradation which also results in premature failure.

The electrical connectors can also vary greatly in size depending on the current capacity of the connector and whether it is constructed integral with the power cord, or is a replacement connector used to replace a damaged connector. Protective enclosures currently do not fit the larger replacement connectors, or if they do, they do not provide the support and durability needed to protect from severe mechanical stresses including stress on the electrical cord and the cord-connector joint.

SUMMARY OF THE INVENTION

The adjustable electrical cord connector protection device is an enclosure for connected electrical connectors, such as is common in use of an extension cord with a power tool or appliance. Adjustments in the size and type of electrical cord and the size and type of electrical connector are accommodated using a protective body which accommodates two cord stops that mechanically grip the cord adjacent to the electrical connector.

Cord stops contain a cord passage opening sized for the particular cord used, and contain one or more cord grip surfaces, selected for the type of cord, extending from the cord passage opening surface. These cord grip surface(s) provide a mechanical grip on the cord resulting in a strong mechanical attachment of the cord to the cord stop.

Differences in size and type of electrical connectors are accommodated by an adjustable placement of the cord stops in the protective body. Each cord stop has an adjustment boss or set of boss adjustment grooves extending around the periphery of the cord stop. The protective body has an opening at each end. The body is made in two halves, split on the axis of the two openings. The portion of each body half adjacent to the opening has a series of adjustment boss grooves to mate with the cord stop adjustment boss, or an adjustment boss to mate with the cord stop adjustment boss grooves, sized to fit the cord stop configuration. Selecting an appropriate groove for placement of the adjustment boss provides a means for adjusting the placement of the electrical connector in the body. The cord stop at each end is individually adjustable thereby accommodating a wide range of connector sizes and types.

The method of protection is to secure the electrical connectors and adjacent cord in the adjustable electrical cord connector protection device. This is accomplished by first placing an electrical cord located adjacent to and connected to a first electrical connector in a first cord stop first half appropriately sized cord passage opening arranged with one or more cord grip surfaces and the exterior of this stop arranged with an adjustment boss.

Then a first cord stop second half is attached to the first half such that the electrical cord is in a second half cord passage opening arranged with one or more cord grip surfaces, which restrain the cord.

Next, an electrical cord located adjacent to and connected to a second electrical connector is placed in a second cord stop which is similar to the first cord stop, and appropriately sized for the second connector cord, and the two halves of the second cord stops restrain that cord.

The first electrical connector is connected to the second electrical connector and the first and second cord stops are placed in an enclosure first body half with the adjustment boss located in an appropriate adjustment boss groove.

Next a second body half is mated to the first body half which completely encloses the connectors and adjacent cord in an enclosure formed by the body halves and the two cord stops and protects them from damage due to external stresses, stress on the cords, and corrosive or dirty environments. The body halves are securely held in place by a body fastener.

The term electrical cord is used in this document to refer to a flexible insulated electrical cable consisting of two or more insulated wires contained in a protective sheath. The wires may be connected to an electrical plug connector at one end and a electrical socket connector at the other end in the case of an extension cord, or may be connected to an electrical plug connector at one end and a tool or appliance at the other end in the case of a power cord.

BRIEF DESCRIPTION OF THE SEVERAL VIEWS OF THE DRAWINGS

A more complete understanding of the present invention can be obtained by considering the detailed description in conjunction with the accompanying drawings, in which:

FIG. 7 is a front view of the cord connector protection device with the body halves separated and a second type of cord connector combinations installed in the device.

FIG. 8 is a side exploded view of the cord stop left and right halves.

FIG. 9 is a plan view of an embodiment of the separated cord stop left and right halves.

FIG. 15 is a front view of fourth embodiment of the cord connector protection device with the body halves separated and a second type of cord connector combinations installed in the device.

FIG. 16 is a side exploded view of the fourth embodiment of cord stop left and right halves.

FIG. 17 is a plan view of a fifth embodiment of the separated cord stop left and right halves.

REFERENCE NUMERALS IN DRAWINGS

Figure 1:
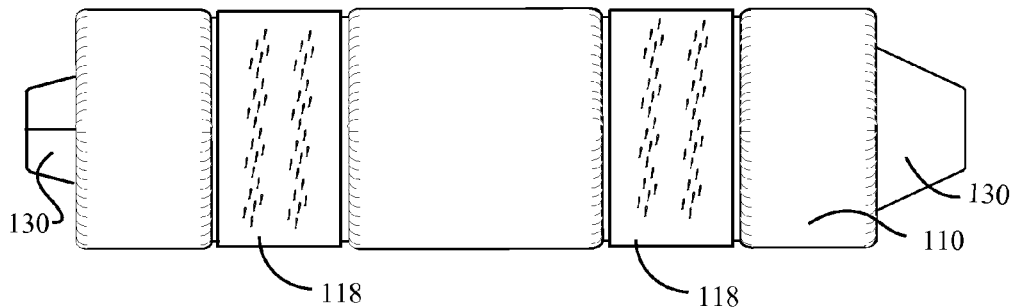
FIG. 1 is a front view of the adjustable cord connector protection device.

These reference numbers are used in the drawings to refer to areas or features of the invention.
110 Body
112 Body first half.
114 Body second half
116 Body alignment boss and landing
118 Body fastener assembly
120 Body axis
122 Electrical connector chamber
124 Body closure surface
126 Body fastener assembly opening
130 Cord stop
132 Cord stop first half
134 Cord stop second half
136 Cord stop half attachment means
138 Cord stop cord passage opening axis
140 Adjustment boss
142 Cord stop cord passage opening
144 Cord stop cord grip surface
146 Cord stop mating surface
148 Cord stop alignment projection and opening
160 Body interior
162 Adjustment boss groove
180 Electrical cord and connector

DETAILED DESCRIPTION OF THE INVENTION

The adjustable electrical cord connector protection device exterior is shown in FIGS. 1 through 4. The primary components are the device body (110), a first cord stop (130), a second cord stop (130) and a body fastener (118). The device body (110) has a first (112) and a second half (114) as shown in FIGS. 5 through 7 and 13 through 16.

The body (110) and cord stop (130) materials are impact resistant polymers typically formed by a molding process or additive manufacturing process to produce the features described.

Figure 2:
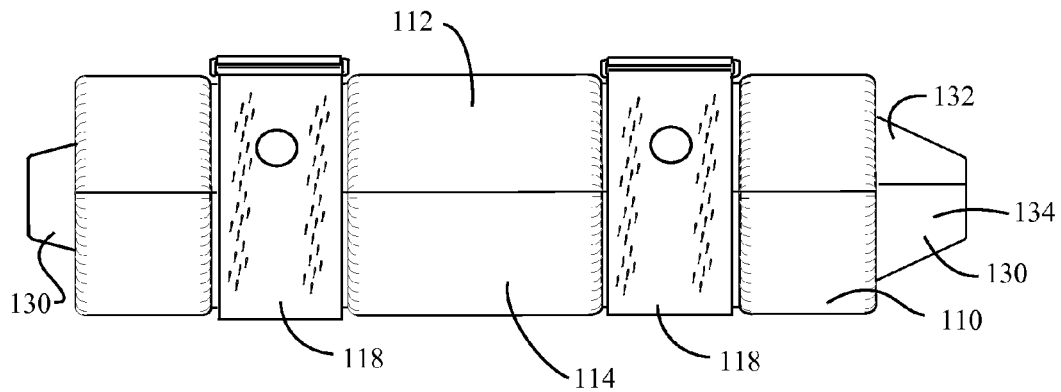
FIG. 2 is a top view of the adjustable cord connector protection device.
Figure 3:
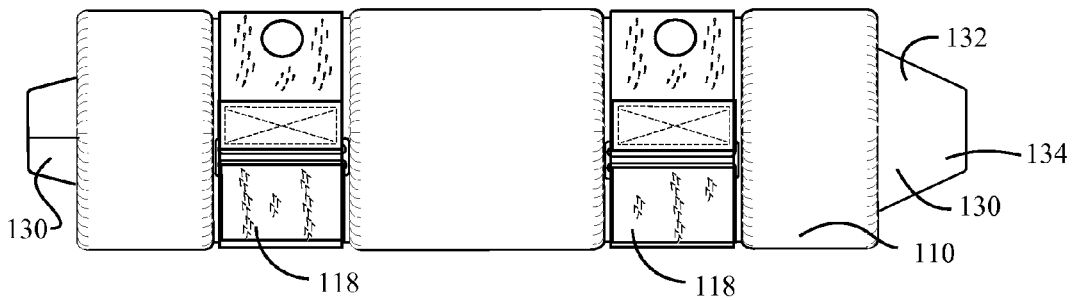
FIG. 3 is a back view of the adjustable cord connector protection device.

In FIG. 1 a front view of the body (110) is shown to be assembled with the cord stops (130) inside the body, closing the body openings at each end of the body (110). FIG. 2 shows the body (110) from the top, and FIG. 3 shows the body (110) from the back. The body (110) is shown in FIG. 2 as consisting of a first half (112) and a second half (114). The halves are retained together by one or more body fasteners (118), such as the Velcro® strap with buckle, as shown, or other secure fastening means.

Figure 4:
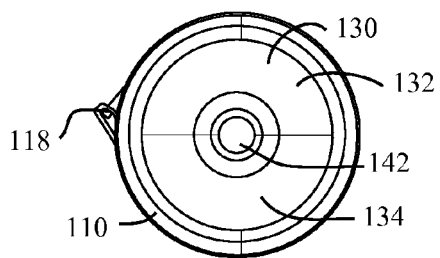
FIG. 4 is a left end view of the adjustable cord connector protection device.

FIG. 4 shows a side view of the body halves (110) showing the cord stop (130) retained in the body opening. Each cord stop has a cord passage (142) opening to allow passage of the electrical cords at each end of the body (110). The cord stops also have a first half (132) and a second half (134) as shown in FIGS. 4, 8 through 11, and 27, 28.

Figure 5:
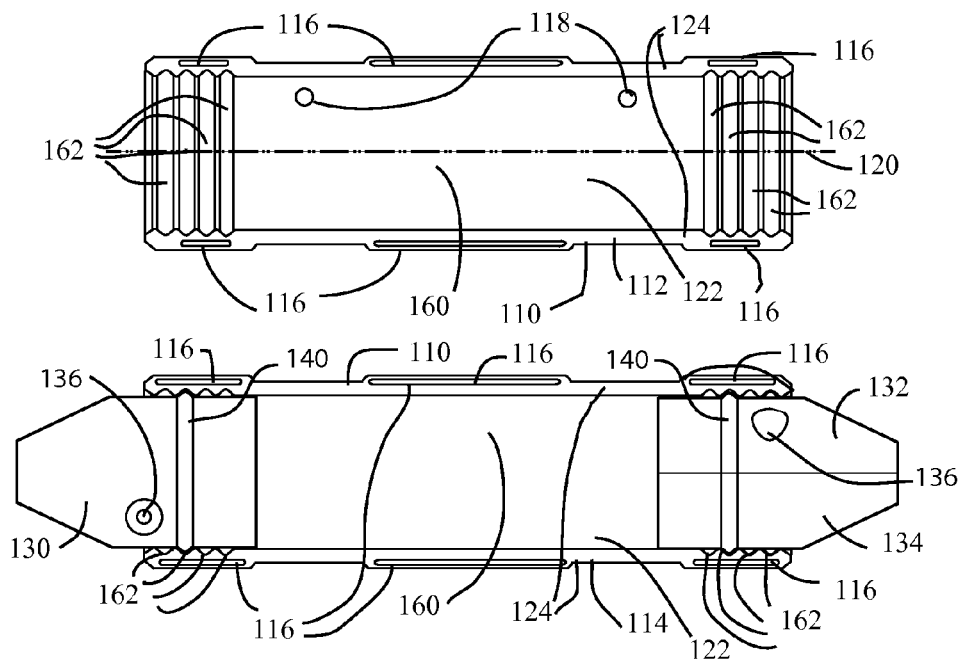
FIG. 5 is a front view of the adjustable cord connector protection device with the body halves separated.
Figure 13:
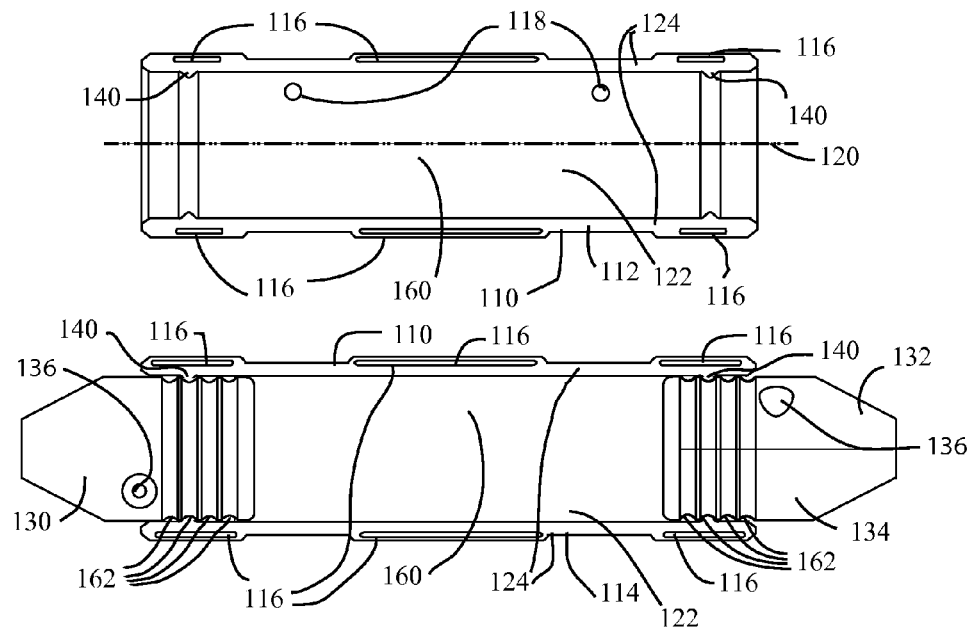
FIG. 13 is a front view of a fourth embodiment of the adjustable cord connector protection device with the body halves separated.
Figure 25:
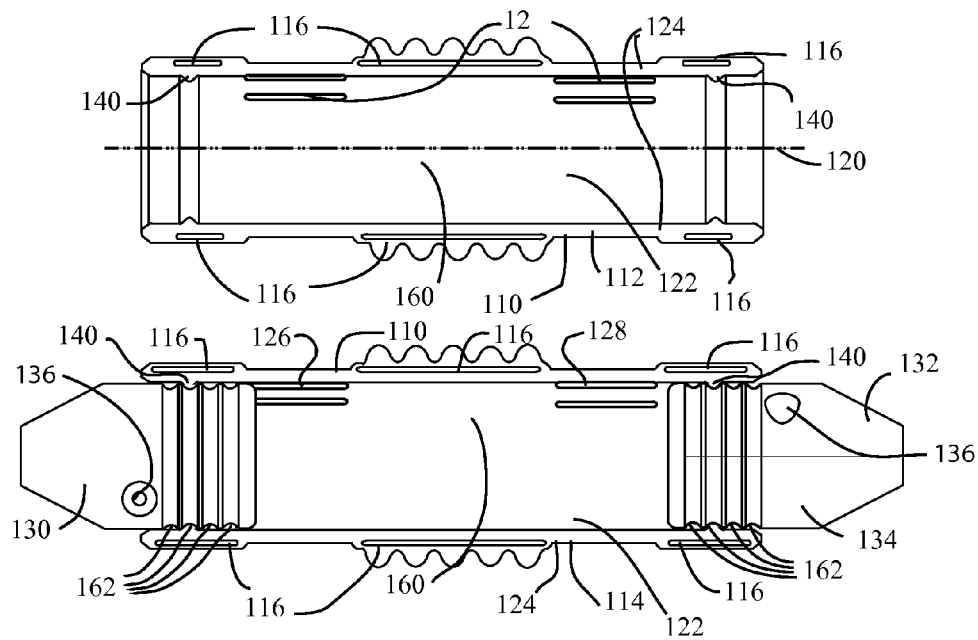
FIG. 25 is a front view of an eighth embodiment of the adjustable cord connector protection device with the body halves separated.

FIGS. 5, 13, and 25 show the body (110) first half (112) and second half (114) disassembled showing the body interior with the cord stops (130) inserted in the second half (114). The body interior is annular around the body axis (120) with openings at each end of the axis. The interior near the openings has a series of adjustment boss grooves (162) in the interior wall, FIG. 5, or alternately, an adjustment boss (140), FIG. 13. The closure surfaces (124) of the body (110) also have an alignment boss (116) on one side of the body half, and an alignment landing (116) on the opposite side arranged such that the boss (116) of one body half (112) will insert into the alignment landing 116) of the second body half (114). This maintains alignment of the two halves of the body (110) when assembled and places the two body half closure surfaces (124) in contact. Body fastener openings (126) may be provided in the body as needed to retain the fastener assembly (118) parts.

Figure 6:
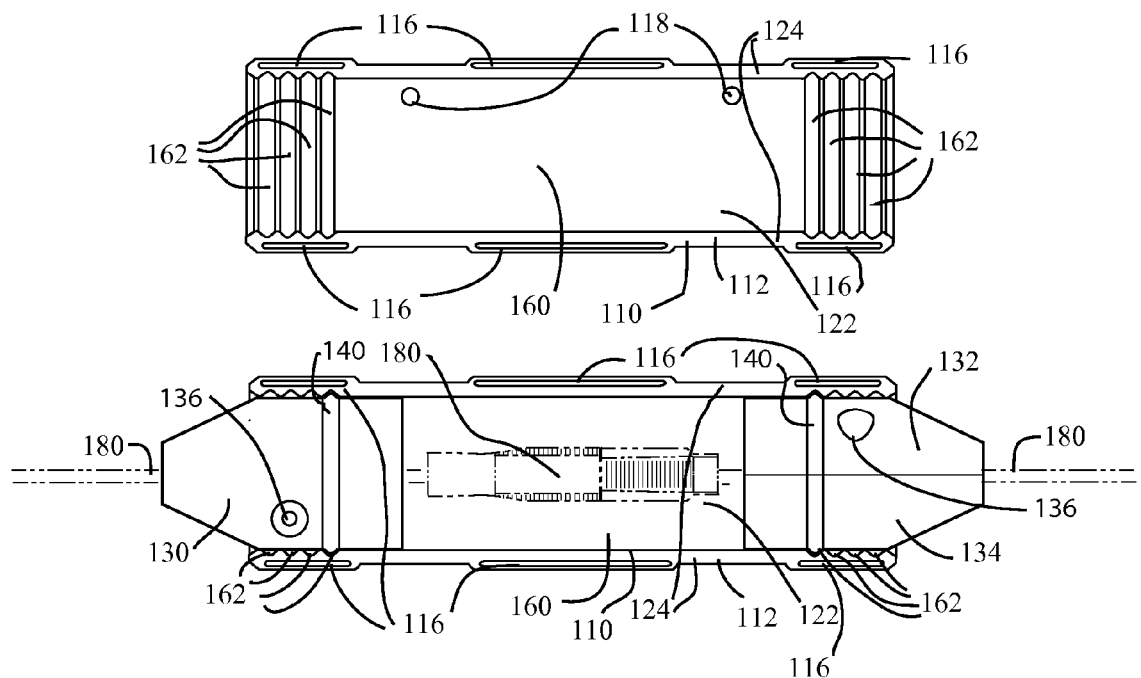
FIG. 6 is a front view of the cord connector protection device with the body halves separated and one type of cord connector combinations installed in the device.
Figure 14:
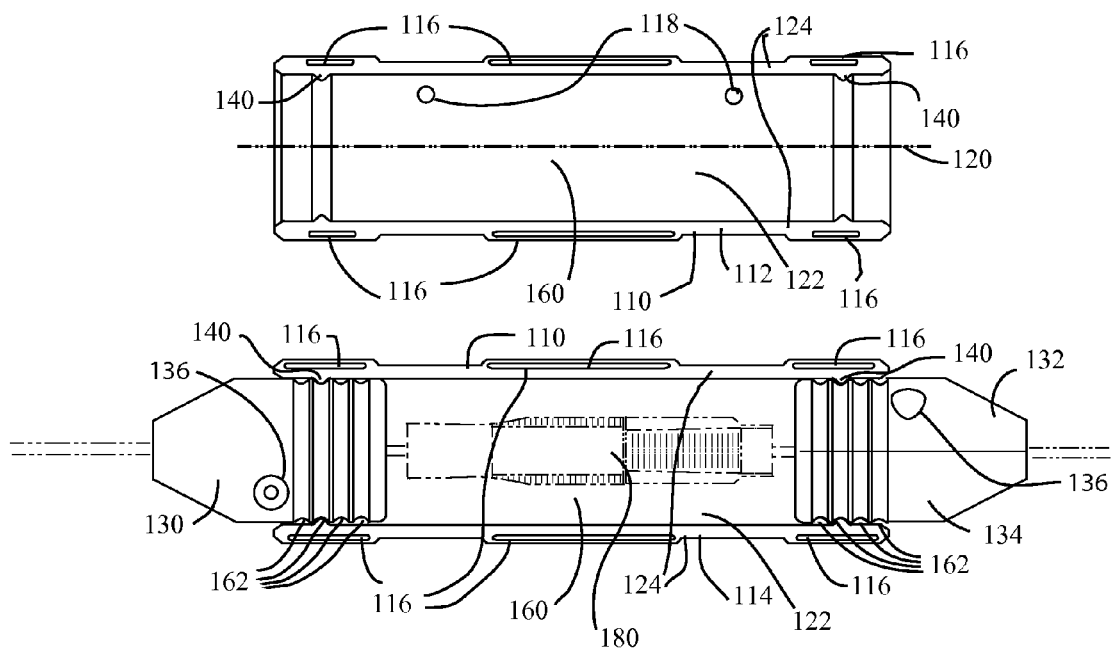
FIG. 14 is a front view of a fourth embodiment of the cord connector protection device with the body halves separated and one type of cord connector combinations installed in the device.
Figure 26:
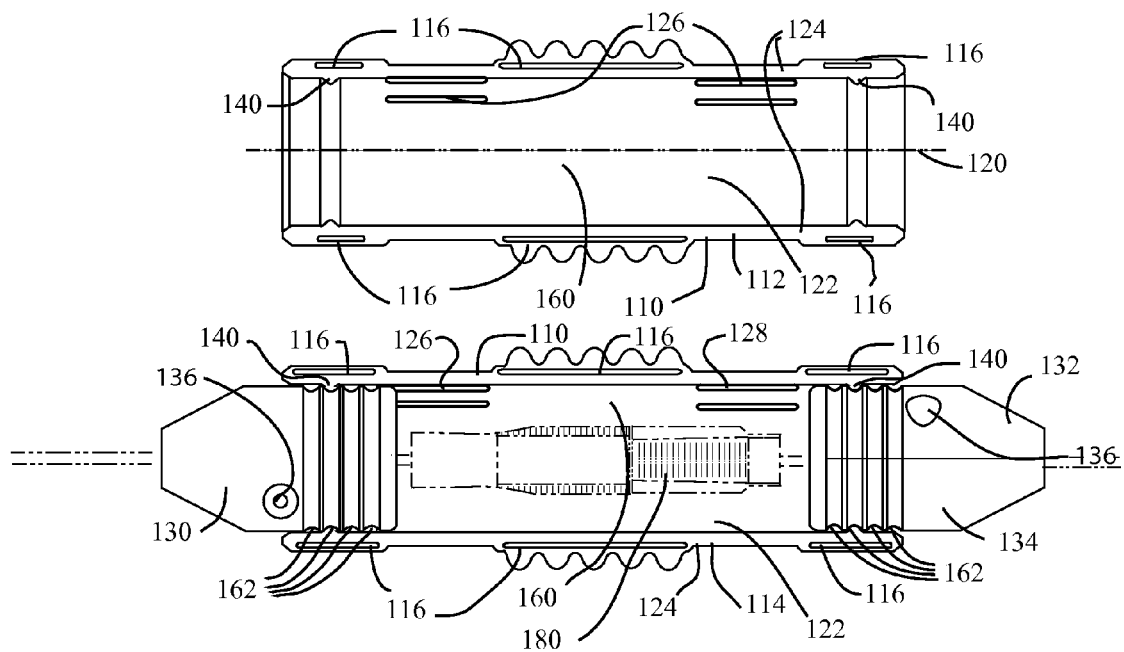
FIG. 26 is a front view of an eighth embodiment of the adjustable cord connector protection device with the body halves separated and one type of cord connector combinations installed in the device.

FIGS. 6, 14 and 26 illustrate a body (110) first half (112) and second half (114) disassembled with one example of electrical cord and connectors (180) contained in the body (110) and cord stops (130). Those familiar with the art will recognize these as representative of power cord and extension cord plugs and outlets. The cord stops (130) are located in appropriate adjustment boss grooves (162) for the size of the connector.

FIGS. 7 and 15 illustrate a body (110) first half (112) and second half (114) disassembled with a second example of electrical cord and connectors (180) contained in the body (110) and cord stops (130). Those familiar with the art will recognize these as representative of a replacement power cord plug and extension cord outlet, or as a 220 v power cord plug and extension cord outlet. These cord stops (130) are also located in appropriate adjustment boss grooves (162) for the size of connector.

The cord stop (130) first half (132) and second half (134) are shown disassembled in FIGS. 8 through 11, 16 through 19, and 27-28. FIGS. 8 and 16 show an exploded side view of the two halves. The cord stop (130) first half (132) and second half (134) each have an adjustment boss (140), FIGS. 8-11 or series of adjustment boss grooves (162), FIGS. 16-19, arranged around the periphery of the cord stop (130). Attachment means (132), example screws or similar fasteners, are used to retain the two halves together at the mating surfaces (146) and to align the two halves symmetrical around the cord stop axis (138) shown in FIGS. 9 through 11 and 17 through 19. The halves are split on this cord stop axis (138) as shown.

FIGS. 9 and 17 show a cord stop (130) first half (132) and second half (134) side by side showing the two halves form a cord passage opening (142) arranged symmetrically around the cord stop axis (138). The passage sizing may vary, as shown in FIGS. 9 through 11 and 17 through 19, to accommodate different electrical cord sizes. Each cord passage opening (142) contains one or more cord grip surfaces (144), in this embodiment arranged as protrusions around the circumference of the cord passage (142) extending from the cord passage (142) inner surface. These project into the passage (142) to press on the electrical cord contained there. The number of cord grip surfaces (144) may vary, as shown in FIGS. 9 through 11 and 17 through 19, to accommodate different electrical cord sizes and composition. The cord grip surfaces (144) compress the electrical cord when the attachment means (136) connects the two halves, causing the cord stops (130) to attach to the electrical cords (180). This compression secures the cord in the cord stop (130), preventing any stresses applied to the electrical cords from being transmitted to the electrical connectors (180) and provides a sealing means of the cord passage openings (142).

Figure 10:
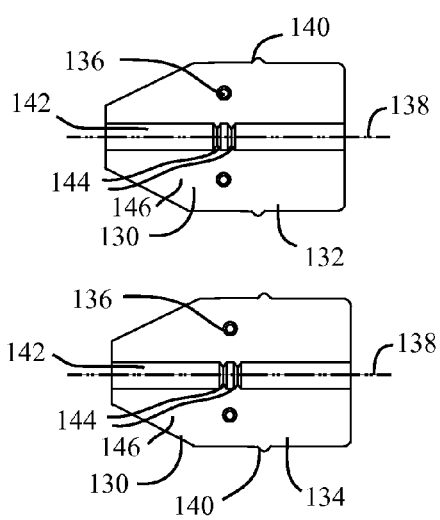
FIG. 10 is a plan view of a second embodiment of the separated cord stop left and right halves.
Figure 11:
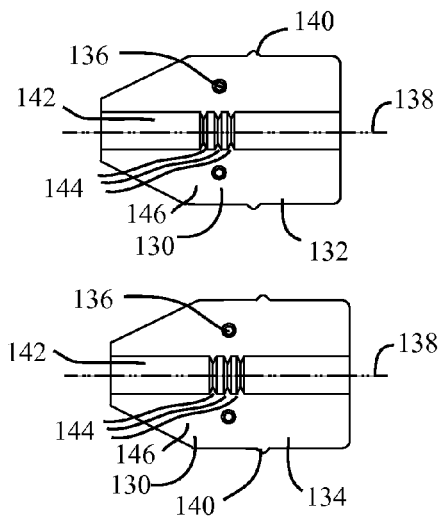
FIG. 11 is a plan view of a third embodiment of the separated cord stop left and right halves.
Figure 18:
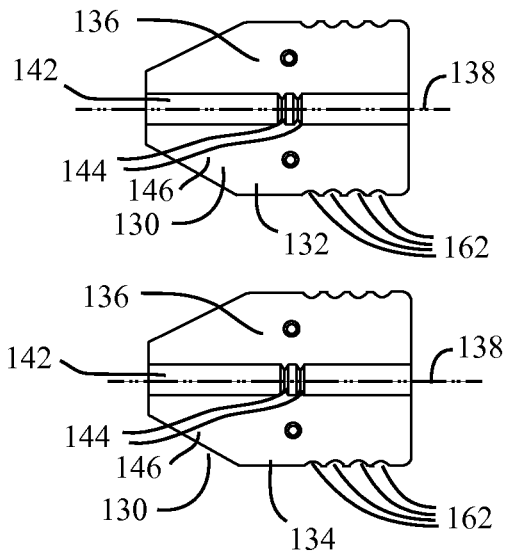
FIG. 18 is a plan view of a sixth embodiment of the separated cord stop left and right halves.
Figure 19:
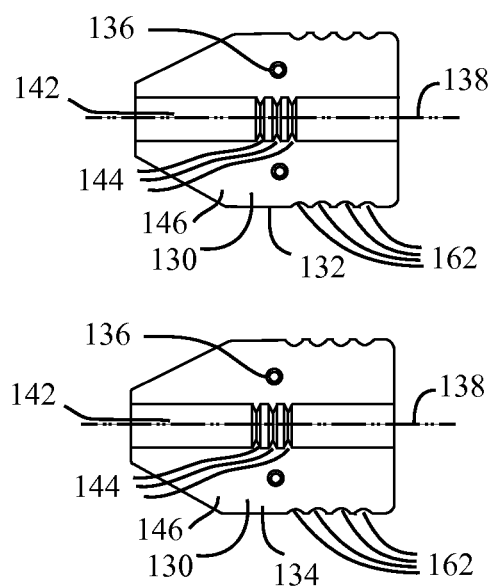
FIG. 19 is a plan view of a seventh embodiment of the separated cord stop left and right halves.

FIGS. 9 and 17 show a cord stop (130) with the first half (132) and second half (134) arranged for a smaller diameter cord requiring just one cord grip surface (144). FIGS. 10 and 18 show a cord stop (130) with the first half (132) and second half (134) arranged for a larger diameter cord than that in FIGS. 9 and 17. There are two cord grips (144) provided for that cord. FIGS. 11 and 19 show a cord stop (130) with the first half (132) and second half (134) arranged for a larger diameter cord than that in FIGS. 10 and 18. There are three cord grip surfaces (144) provided for that cord.

Figure 27:
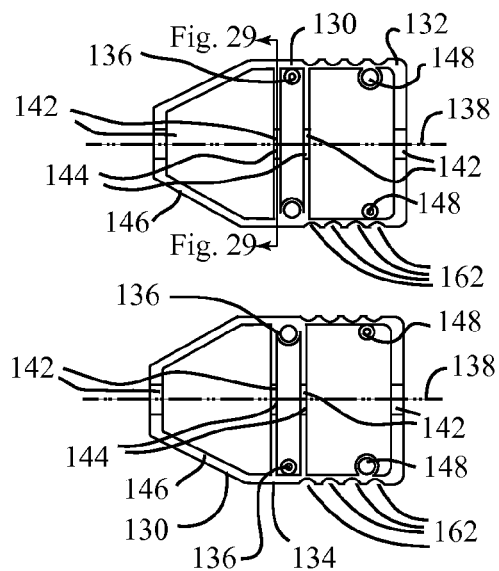
FIG. 27 is a plan view of an eighth embodiment of the adjustable cord connector protection device separated cord stop left and right halves. The location of the cross-section of FIG. 29 is shown in the half in the upper portion of the cord stop.
Figure 28:
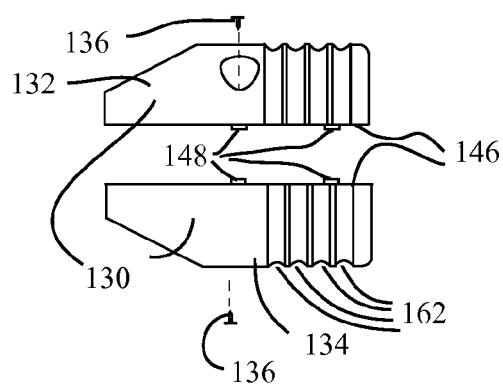
FIG. 28 is a side exploded view of the eighth embodiment of the adjustable cord connector protection device cord stop left and right halves.
Figure 29:
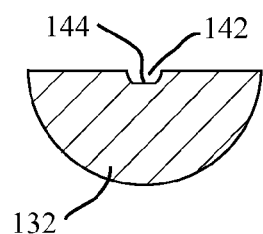
FIG. 29 is a cross-section of one half of the eighth embodiment of the adjustable cord connector protection device cord stop at the location indicated in FIG. 27.

FIGS. 27 and 28 show a cord stop (130) with the first half (132) and second half (134) arranged with multiple and separate cord grip surfaces (144) in multiple cord passages (142). FIG. 29 shows the cord grip surface (144) in this embodiment is a protrusion shaped as a geometric chord to the cord passage (142) curved shape and extending from the cord passage (142) inner surface. This projects into the passage (142) to press on the electrical cord contained there. This differs from the cord grip surfaces (144) in FIGS. 8 through 11 and 16 through 19 where the grip surfaces (144) are arranged around the circumference of the cord passage (142). The function is the same, to provide a sealing means of the cord passage openings (142). This embodiment also shows cord stop alignment projections and openings (148) arranged to fit a projection in an opening at multiple locations around the cord stop mating surface (146). These aid alignment of the two halves.

The assembly of the cord stops (130) in the body (110) uses the adjustment boss (140) to position the cord stop in the adjustment boss grooves (162). More than one, in fact multiple grooves are provided as shown in FIGS. 5 through 7, 13 through 17, and FIG. 21. The selection of which groove to use is dependent of the length of the electrical connectors to be accommodated. FIGS. 6, 7, 14, and 15 illustrate diverse sizes, FIG. 6 showing use of the closest together adjustment boss grooves (162), FIGS. 14 and 26 showing intermediate adjustment boss grooves, and FIGS. 7 and 15 showing use of the furthest apart adjustment boss grooves (162).

Figure 12:
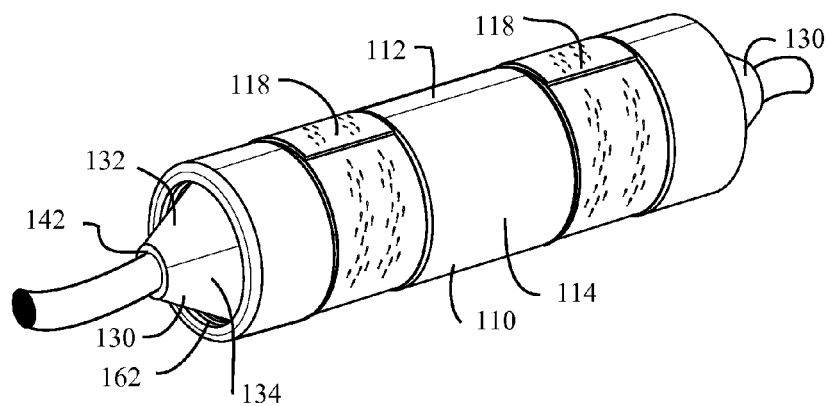
FIG. 12 is a perspective view of the adjustable cord connector protection device containing electrical connectors.

The adjustment boss (140) mates with the selected adjustment boss groove (162) on two sides of the boss (140) and groove (162). This provides both left and a right boss (140) side to groove (162) side contact points around the periphery of the boss and groove. This dual contact on these precisely dimensioned surfaces closes the body openings and provides sealing means of the body (110) openings. The body (110) closure surfaces (124) are also precision surfaces which provide body joint sealing means when in contact. The combination of the body joint sealing means prevent adverse external environmental conditions from affecting the electrical connectors inside the adjustable electrical cord connector protection device body (110) with the cord stops installed and both body halves connected and fastened as shown in FIG. 12. Also, the cord grips (144) in the cord stop (130) cord passage (142) provide means for sealing the cord passage opening between the external environment and the electrical connectors.

Operation

Figure 20:
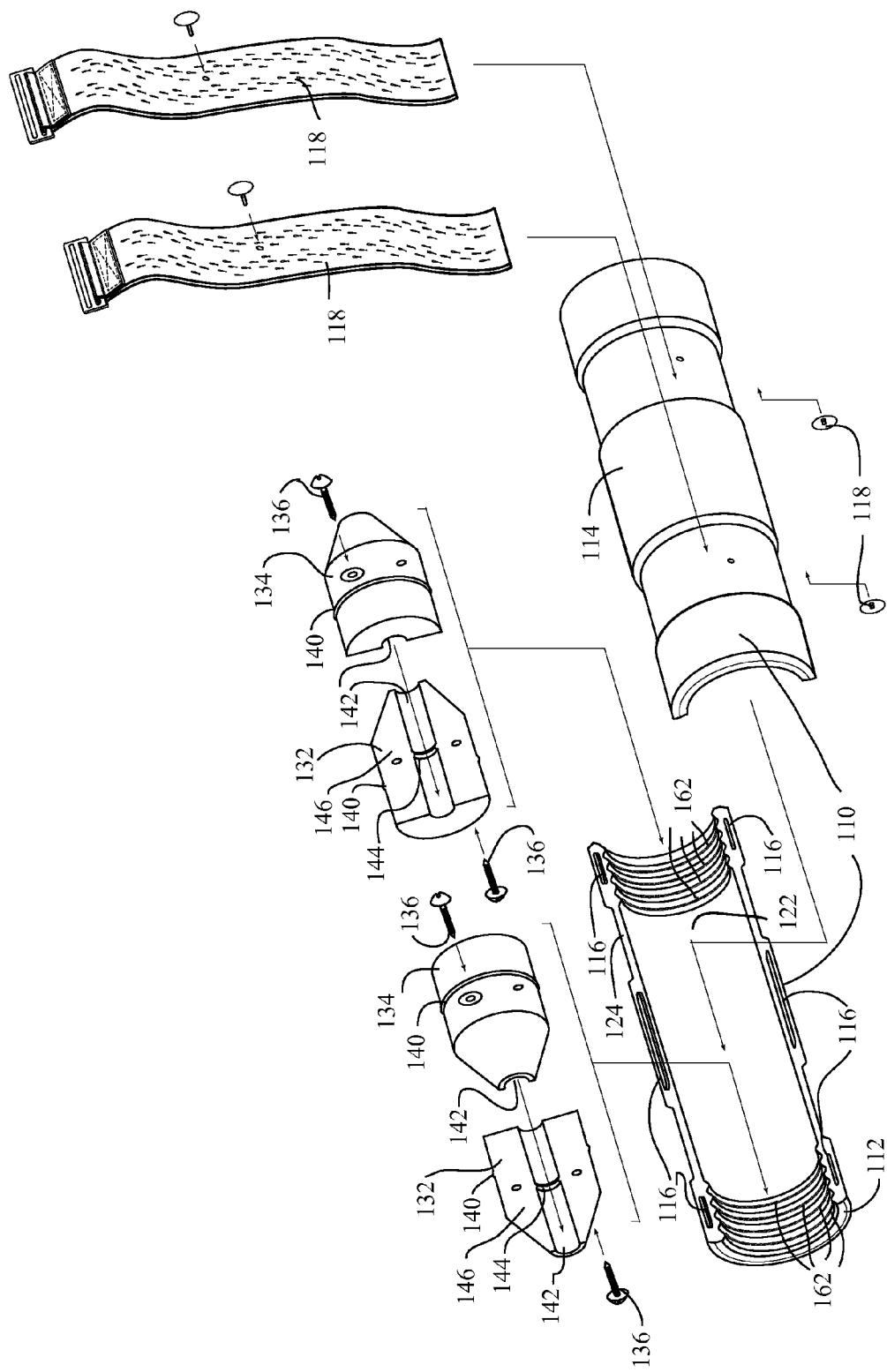
FIG. 20 is a perspective exploded view of an embodiment of the adjustable cord connector protection device.
Figure 21:
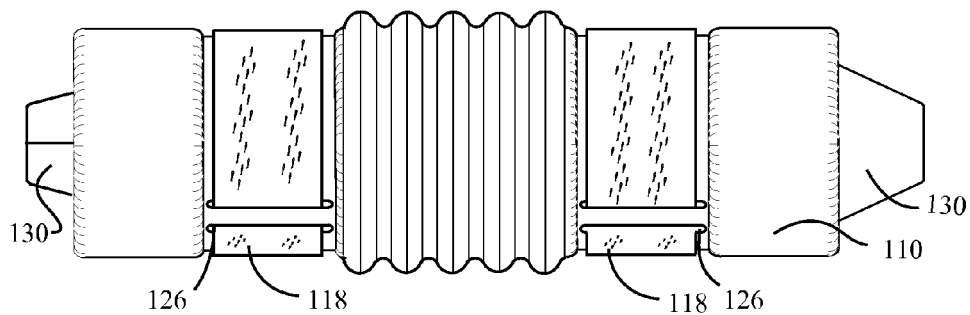
FIG. 21 is a front view of an eighth embodiment of the adjustable cord connector protection device.
Figure 22:
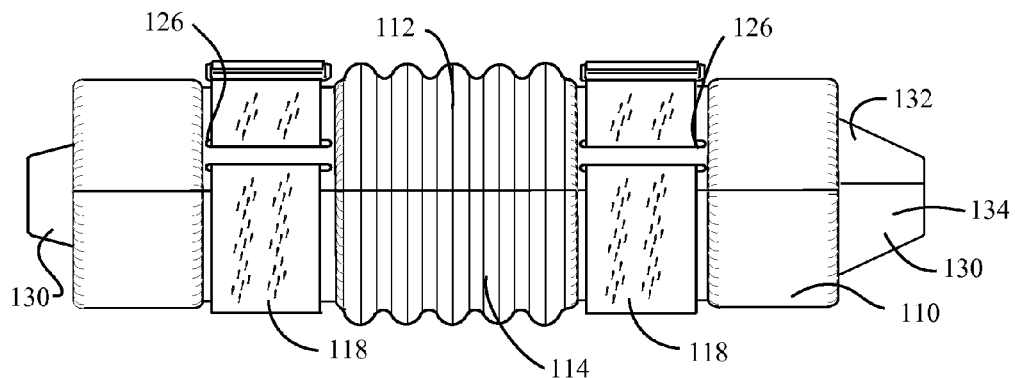
FIG. 22 is a top view of an eighth embodiment of the adjustable cord connector protection device.
Figure 23:
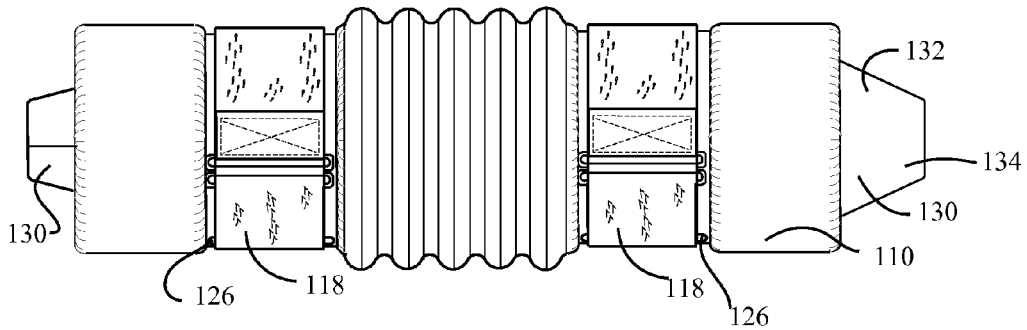
FIG. 23 is a back view of an eighth embodiment of the adjustable cord connector protection device.
Figure 24:
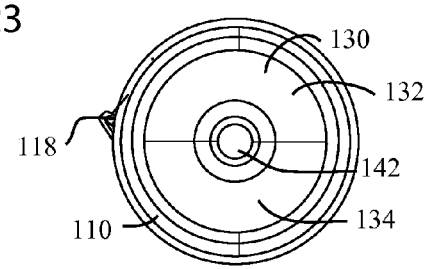
FIG. 24 is a left end view of an eighth embodiment of the adjustable cord connector protection device.

FIG. 20 shows an exploded view illustrating the parts and assembly of one embodiment of the adjustable electrical cord connector protection device. Other embodiments are similarly assembled/disassembled, and so are not shown.

The method of protecting connected electrical cord connectors and adjacent cord in an enclosure is to assemble the adjustable electrical cord connector protection device on the connectors and adjacent cord so as to constrain the connected connectors and adjacent cord so harmful stresses on the cords or to the connectors are absorbed by the device. See FIG. 20 for the assembly of the parts of the device.

Two cord stops (130) are selected that have cord passages (142) sized for the cords used by the electrical connectors (180). These may be similar or dissimilar in size depending on the cords used.

The cord stops (130) are disassembled into two halves (132 and 134), and the electrical cord adjacent to the first electrical connector (180) is inserted into the cord passage (142) of the appropriately sized cord stop first half (132). The cord stop second half (134) is then placed over the first half (132) with the cord stop attachment means (136) aligned so the fasteners may attach the two halves securely and in proper alignment. This provides compression of the cord at the cord stop cord grip surfaces (144) essentially attaching the cord stop on the cord.

The second cord (180) is similarly attached to the second cord stop (130).

The first electrical connector (180) is then connected to the second electrical connector (180) as is shown in FIGS. 6, 7, 14, and 15.

The cord stops (130) are then placed into a body (110) first half (112) with each adjustment boss (140) placed into an appropriate adjustment boss groove (162). This effectively seals the body openings and prevents mechanical stresses on the cords from being transferred to the electrical connectors. The appropriate adjustment boss grooves (162) are those that position the connected electrical connectors (180) in the body electrical connector chamber (122) in the connected condition, and do not unduly stress the electrical cords connected to the connectors (180). The body second half (114) is then placed on top of the body first half (112) and the closure surfaces (124) aligned with the body alignment bosses and landings (118) arranged so the bosses enter the landings such that the body half openings are aligned at each end as shown in FIGS. 1, 2, 3, and 12.

The body fasteners (118) are then connected so the body (110) halves (112 and 114) are constrained in the aligned position to maintain the connected electrical connectors (180) constrained in the enclosure device by the cord stops (130) as illustrated by FIGS. 6, 7, 15, and 16. In this constrained condition stresses on the cords or mechanical shocks are absorbed by the enclosure device and not by the electrical connectors. This also effectively seals the body halves so an adverse environment outside the body does not contact the electrical connectors.

Those skilled in the art will recognize this device and method may be varied. The description of the device and method herein have other possible variations and these descriptions are not intended to limit the invention.

I claim:

1. An enclosure for protection of connected first and second electrical connectors which are attached to first and second electrical cords comprising:
   (a) a first cord stop, a second cord stop, and a body;
   (b) each cord stop arranged with a first half and a second half;
   (c) each half arranged with a mating surface and attachment means, a first end and a second end, a substantially semi-circular outer surface arranged between the first and second ends around a cord stop axis, a substantially semi-circular cord passage arranged between the first and second ends with an inner surface arranged around the cord stop axis and arranged to contain the first electrical cord;
   (d) each cord stop outer surface arranged with a peripheral adjustment boss extending above the surface and also arranged around the cord stop axis;
   (e) each cord passage arranged with one or more cord stop cord grip surfaces extending from the cord passage inner surface;
   (f) the body arranged with a first half and a second half constrained together by a body fastener assembly, each arranged with an interior surface and an exterior surface, a first end and a second end, each end with an opening arranged to contain a cord stop, the interior surface adjacent to each end arranged with two or more cord stop peripheral adjustment boss grooves and an electrical connector chamber between, such that each cord stop may be inserted into a selected body half peripheral adjustment boss groove so that the second body half may be connected to the first half with the electrical connectors are enclosed in the body electrical connector chamber whereby stresses to the cords are isolated from the connectors.

2. The enclosure of claim 1 wherein each cord stop exterior is arranged with two or more cord stop peripheral adjustment boss grooves and each body half arranged with a peripheral adjustment boss extending above the interior surface such that each cord stop may be inserted around the body adjustment boss at a selected adjustment boss groove.

3. The enclosure of claim 1 further comprising the first and second cord stop halves contain one or more cord stop alignment projections and openings arranged to fit a projection in an opening thereby aiding alignment of the first and second cord stop halves.

4. The enclosure of claim 2 further comprising the first and second cord stop halves contain one or more cord stop alignment projections and openings arranged to fit a projection in an opening thereby aiding alignment of the first and second cord stop halves.

5. The enclosure of claim 1 further comprising the cord stop cord grip surface is a protrusions around the circumference of the semi-circular cord passage.

6. The enclosure of claim 1 further comprising the cord stop cord grip surface is a protrusion shaped as a geometric chord to the semi-circular cord passage.

7. The enclosure of claim 2 further comprising the cord stop cord grip surface is a protrusions around the circumference of the semi-circular cord passage.

8. The enclosure of claim 2 further comprising the cord stop cord grip surface is a protrusion shaped as a geometric chord to the semi-circular cord passage.

9. A method of protecting a first and second connected electrical cord connector and adjacent connected cord in an enclosure comprising:
   (a) selecting a first and a second cord stop, each arranged with a first end and a second end, a continuous inner cord passage opening surface around an axis between the ends arranged to fit the first electrical cord, and an exterior surface arranged with a peripheral adjustment boss extending from the exterior surface perpendicular to the cord passage opening surface axis, the cord passage opening with one or more cord grip surfaces protruding from the opening surface and arranged to contact the outer surface of the cord;
   (b) separating the first and second cord stop into a first half and a second half with the split of the halves on the cord stop opening axis such that each cord stop half has a cord passage surface with one or more cord grip surfaces;
   (c) placing the first and second electrical cord in the appropriate cord stop first half cord passage in contact with the cord passage opening surface;
   (d) attaching each cord stop second half to the first half such that the electrical cord external surface is in contact with the cord passage opening surface whereby each cord stop is effectively attached to the electrical cord;
   (e) connecting the first electrical connector to the second electrical connector;
   (f) selecting a body arranged with a first half and a second half divided on a body axis, arranged with an interior surface and an exterior surface, a first end and a second end, each end with an opening arranged to contain a cord stop, the interior surface arranged with two or more cord stop peripheral adjustment boss grooves adjacent to each end and an electrical connector chamber between the peripheral adjustment boss grooves at each end, (g) placing the first cord stop continuous peripheral adjustment boss in an appropriate enclosure first body half peripheral adjustment boss groove at a first end;

(h) placing the second cord stop continuous peripheral adjustment boss in an enclosure first body half peripheral adjustment boss groove at a second end and arranged such that the connected electrical connectors remain connected;

(i) aligning a substantially identical enclosure second body half to the first body half; and (j) fastening the first body half to the second body half whereby the electrical connectors and adjacent wiring are constrained and protected in the body.

10. The method of claim 9 whereby the cord stops of step (a) exterior surface is arranged with two or more cord stop peripheral adjustment boss grooves extending from the exterior surface perpendicular to the cord passage opening surface axis, and the body of step (f) interior surface is arranged with a peripheral adjustment boss whereby steps (g) and (h) are:

(g) placing an appropriate first cord stop adjustment boss groove in the first body half adjustment boss at a first end;

(h) placing an appropriate second cord stop adjustment boss groove in the first body half peripheral adjustment boss at a second end and arranged such that the connected electrical connectors remain connected.

11. A protection device for connected electrical cord connectors comprising:

(a) a body made of a first half and a second half each half with a first end and a second end, each end with an opening providing access to the interior, and two or more adjustment boss grooves in the interior adjacent to the opening, and an electrical connector chamber in the interior between the grooves;

(b) a first cord stop and a second cord stop each with a first end and a second end and arranged in a first half and a second half symmetrically configuring a cord passage opening between the cord stop ends, and an exterior surface arranged with a peripheral adjustment boss extending from the exterior surface;

(c) each cord stop arranged to close a body opening with the adjustment boss contact with a body adjustment boss groove providing a sealing means of the body openings;

(d) the cord stop cord passage further arranged with a cord passage opening sealing means to the electrical cord; and (e) the body arranged with body joint sealing means whereby the electrical connector chamber is protected against an adverse environment outside the device.

12. The protection device of claim 11 wherein the body interior is arranged with an adjustment boss adjacent to the opening, and the first and second cord stop exterior is arranged with two or more adjustment boss grooves wherein item (c) is:

(c) each cord stop arranged to close a body opening with the adjustment boss groove contact with the body adjustment boss providing a sealing means of the body openings.

13. The protection device of claim 11 wherein the first and second cord stop halves contain one or more cord stop alignment projections and openings arranged to fit a projection in an opening thereby aiding alignment of the first and second cord stop halves.

14. The protection device of claim 12 wherein the first and second cord stop halves contain one or more cord stop alignment projections and openings arranged to fit a projection in an opening thereby aiding alignment of the first and second cord stop halves.

15. The protection device of claim 11 further comprising the cord stop cord sealing means to the electrical cord is one or more protrusions around the circumference of the semi-circular cord passage.

16. The protection device of claim 11 further comprising the cord stop cord sealing means to the electrical cord is a protrusion shaped as a geometric chord to the semi-circular cord passage.

17. The protection device of claim 12 further comprising the cord stop cord sealing means to the electrical cord is one or more protrusions around the circumference of the semi-circular cord passage.

18. The protection device of claim 12 further comprising the cord stop cord sealing means to the electrical cord is a protrusion shaped as a geometric chord to the semi-circular cord passage.

* * * * *